F. MYERS.
MIXER.
APPLICATION FILED OCT. 1, 1915.
1,203,899.
Patented Nov. 7, 1916.
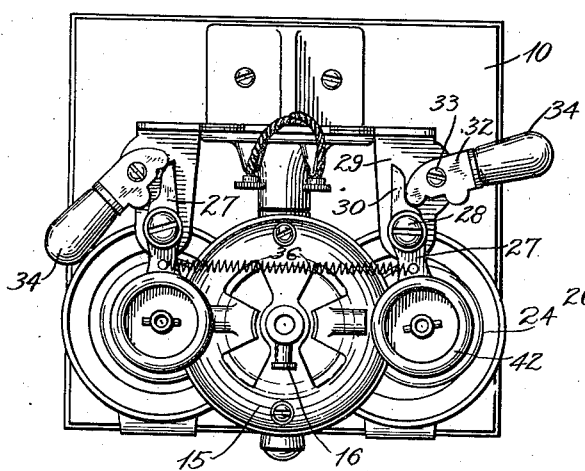
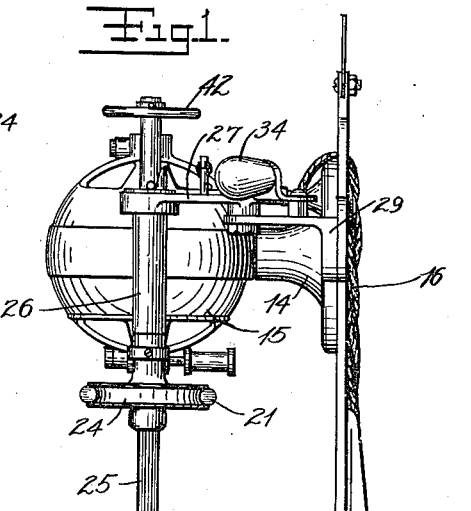
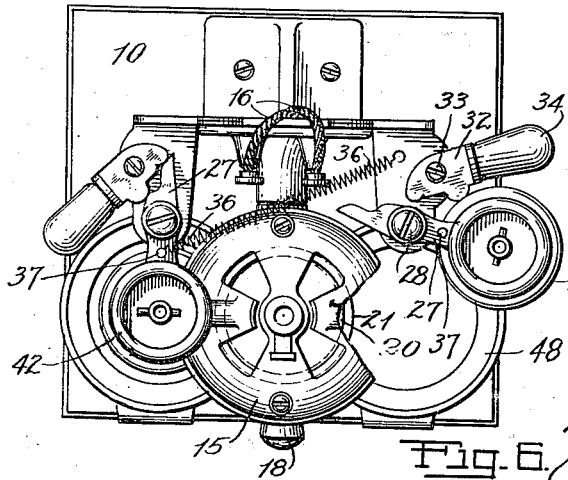
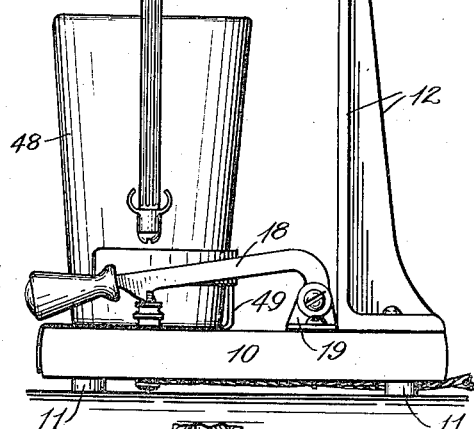
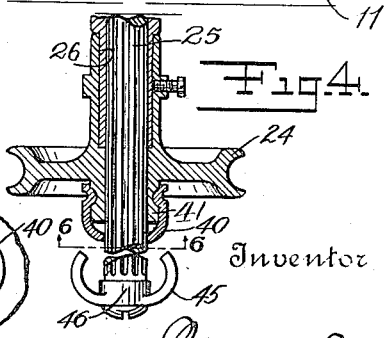
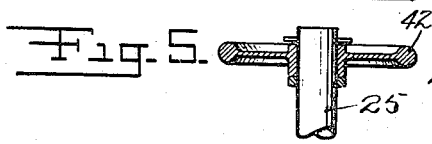
Inventor
Frederick Myers

UNITED STATES PATENT OFFICE.

FREDERICK MYERS, OF NEW YORK, N. Y., ASSIGNOR TO FRED MYERS MFG. CO., OF NEW YORK, N. Y., A CORPORATION OF NEW YORK.

MIXER.

1,203,899.  Specification of Letters Patent.  Patented Nov. 7, 1916.

Application filed October 1, 1915. Serial No. 53,493.

*To all whom it may concern:*

Be it known that I, FREDERICK MYERS, a citizen of the United States, residing at New York, in the county of New York and State of New York, have invented new and useful Improvements in Mixers, of which the following is a specification.

This invention relates to improvements in mixers, and particularly to that class of mixers used in the preparation of beverages composed of several ingredients of different specific gravity, or condition, as fluid or solid, such as milk in a raw, condensed or dry state, fruit extracts, sugar, mineral or carbonated waters and the like.

The objects are to provide a mechanism that is especially easy to manipulate, simple in construction and efficient in operation. These objects are attained by the novel arrangement and combination of parts hereinafter described and shown in the accompanying drawings, although it is to be understood that modifications, variations and adaptations may be made in the structure within the scope of the annexed claims.

Referring to the drawings, Figure 1 is a side elevation of an embodiment of the invention, illustrating the mechanism in operative position. Fig. 2 is a plan view of the same, one of the beater spindles being in operative contact and the other held out of engagement. Fig. 3 is a similar plan view, one of the spindles being farther removed from the driving means. Fig. 4 is an enlarged vertical sectional view through one of the beater spindles, at the bottom thereof, the spindle being raised. Fig. 5 is a similar view of the same, but taken at the upper portion, and Fig. 6 is a transverse sectional view taken on line 6—6 of Fig. 4.

This machine, in contradistinction to prevailing types, provides for the simultaneous mixing of two portions or glasses of the drink at the same operation, thereby saving time and making it possible to serve two persons with freshly mixed drinks at the same moment.

The mechanism is mounted on a base or pedestal 10 raised from its supporting surfaces by the feet 11, and having a standard 12 to which is affixed a bracket 14 carrying the electric motor 15, the current carrying wires 16 of which are controlled by the switch 18, pivoted on a bracket 19 to the base 10 in front of the standard 12, the switch handle extending forward where it can be conveniently operated.

On the lower end of the vertical motor shaft is secured a grooved driving wheel 20 having an endless circular elastic band tightly engaged in its groove, and acting as a driver for the friction wheels 24 on the mixer spindles 25. These spindles are mounted vertically to rotate in sleeve bearings 26 extending down from levers 27 pivoted by the screw stud 28 to the brackets 29, rigidly secured to the standard 12 at each side of the motor. Extensions 30 of the levers 27 project rearwardly and engageable with them are the levers 32, pivoted at 33 to the brackets 29 and provided with operative handles 34. The levers 27 have connecting between them a coiled pull spring 36 secured at its ends to pins 37 in such manner as to draw the spindles normally toward each other and cause the wheels 24 to make frictional driving contact with the elastic ring 21 on the motor shaft. The hand levers 34 will then be in the position shown on the left hand side of Figs. 2 and 3, but when it is desired to disengage either of the spindles, the levers 34 are turned outwardly (see the right hand of Fig. 2) causing the lever point to press the extension 30 in toward the center.

If for any reason it be desired to obtain more room between the wheels and the driver, the spring 36 may be disengaged at one end, allowing the spindles to be swung farther outward. This is desirable when a new band is to be placed in position on the driver, or the machine thoroughly cleaned.

The lower portion of the spindle 25 is preferably fluted or corrugated longitudinally as shown, and driven by frictional contact with the rubber driver 40 attached to the hub 41 of the wheels 24 as shown in Fig. 4; this driver accomplishes a double purpose, that of transmitting motion and also of cleaning the spindle in the manner of a scraper or squeegee as the spindle is moved through it by the hand wheel 42, mounted to rotate freely at the top of the spindle 25, which at its upper portion is preferably smooth. By means of the frictional engagement between the spindle and driver 40 it is possible to adjust its operative height either when running or still. At the extreme end of the spindle is a pair of beater arms 45 formed with the hub 46 adapted to enter a glass or similar container 48, in which the ingredients of the drink are placed, the arms, when in operation, thoroughly agitating and mixing the contents. These glasses are supported by guides 49 fixed on the upper surface of the platform 10 in such manner that when the spindles are raised, they can be readily removed or replaced.

In operation, one or both glasses being filled, they are placed in the guides, the spindles lowered by the hand wheels 42 to such depth as may be desired, the hand levers 34 turned forward and the switch 18 depressed thereby starting the motor and causing the beaters to revolve; when the drink is mixed as desired, the motor is stopped or the spindles caused to stop rotating by the hand levers and the beaters raised, whereupon the drink is ready to be dispensed.

Having thus described my invention what I claim as new and desire to obtain by Letters Patent is:—

1. In a beater, a pair of spindles having beaters at their lower ends, means for frictionally rotating either or both of said spindles, means for adjusting said spindles vertically, means for maintaining said spindles in an adjusted position and means for moving said spindles laterally with respect to the driving means.

2. In a beater, the combination with a base, a stand rising therefrom and a motor vertical on said stand, of a pair of spindles having beaters at their lower ends, wheels on said spindles adapted to be frictionally driven by said motor, means for keeping said wheels normally in engagement with said motor, and levers for disengaging said wheels therefrom.

3. In a beater, the combination with a base, a stand rising therefrom and a motor vertical on said stand, of a pair of spindles having beaters at their lower ends, wheels on said spindles adapted to be frictionally driven by said motor, means combined with said wheels for transmitting rotary motion to said spindles, said means also acting as wipers therefor, and means for raising or lowering said spindles independently of said wheels.

4. In a beater, the combination with a base, a stand rising therefrom and a motor vertical on said stand, of a pair of spindles having beaters at their lower ends, wheels on said spindles adapted to be frictionally driven by said motor, levers for actuating said wheels into and out of engagement with said motor, a removable tension means between said spindles, means for holding said spindles at any desired height when rotating or quiescent, and a manually operated means for raising or lowering said spindles, said means being non-rotatable while in the grasp of the operator.

5. In a beater, a pair of spindles having beaters at their lower ends, means for frictionally rotating either or both of said spindles, levers upon which said spindles are mounted, means for constraining said levers normally toward each other, means whereby said constraining means may be released, means for operating said levers whereby said spindles may be positively moved to or from the driving means, means for raising and lowering said spindles and means for wiping said spindles as they are raised.

In testimony whereof I have signed my name to this specification.

FREDERICK MYERS.